United States Patent [19]

Roman

[11] 4,451,270
[45] May 29, 1984

[54] ABSORPTION PROCESS FOR PRODUCING OXYGEN AND NITROGEN AND SOLUTION THEREFOR

[75] Inventor: Ian C. Roman, Bend, Oreg.
[73] Assignee: Bend Research, Inc., Bend, Oreg.
[21] Appl. No.: 393,711
[22] Filed: Jun. 30, 1982
[51] Int. Cl.³ .............................................. B01D 19/00
[52] U.S. Cl. ........................................... 55/38; 55/43; 55/53; 55/68; 252/188.28; 252/181.7; 252/181.6
[58] Field of Search .................... 55/68, 38, 43, 45, 57, 55/48, 51, 53; 423/219, 579; 252/188.28, 181.7, 181.6

[56] References Cited

U.S. PATENT DOCUMENTS

| | | | |
|---|---|---|---|
| 1,056,244 | 3/1913 | Wiley | 55/48 |
| 1,722,458 | 7/1929 | Baufre | 55/48 |
| 2,144,692 | 1/1939 | Schuftan | 55/43 |
| 3,728,281 | 4/1973 | Marks et al. | 252/188.28 |
| 3,738,086 | 6/1973 | Bellisio et al. | 55/48 |
| 3,762,133 | 10/1973 | Merriman et al. | 55/53 |
| 3,824,766 | 7/1974 | Valentine et al. | 55/48 |
| 4,032,617 | 6/1977 | Gay | 423/219 |
| 4,106,916 | 8/1978 | Tuckett et al. | 55/48 |
| 4,317,731 | 3/1982 | Roberts, Jr. et al. | 55/51 |

FOREIGN PATENT DOCUMENTS

| | | | |
|---|---|---|---|
| 53-16384 | 2/1978 | Japan | 55/68 |
| 56-48244 | 5/1981 | Japan | 55/68 |
| 56-48246 | 5/1981 | Japan | 55/68 |
| 56-48243 | 5/1981 | Japan | 55/68 |

*Primary Examiner*—Bernard Nozick
*Attorney, Agent, or Firm*—Chernoff, Vilhauer, McClung, Birdwell and Stenzel

[57] ABSTRACT

Process for the separation and purification of oxygen and nitrogen is disclosed which utilizes solutions of oxygen carriers to selectively absorb oxygen from a gaseous stream, leaving nitrogen as a byproduct. In the process, an oxygen carrier capable of reversibly binding molecular oxygen is dissolved in a solvent solution, which absorbs oxygen from an oxygen-containing gaseous feed stream such as atmospheric air and desorbs oxygen to a gaseous product stream. The feed stream is maintained at a sufficiently high oxygen pressure to keep the oxygen carrier in its oxygenated form during absorption, while the product stream is maintained at a sufficiently low oxygen pressure to keep the carrier in its deoxygenated form during desorption. In an alternate mode of operation, the carrier solution is maintained at a sufficiently low temperature and high oxygen pressure to keep the oxygen carrier in its oxygenated form during absorption, and at a sufficiently high temperature to keep the carrier in its deoxygenated form during desorption. Under such conditions, exceptionally high oxygen concentrations on the order of 95% to 99% are obtained, as well as a long carrier lifetime in excess of 3 months, making the process commercially feasible.

35 Claims, 1 Drawing Figure

FIGURE 1

ABSORPTION PROCESS FOR PRODUCING OXYGEN AND NITROGEN AND SOLUTION THEREFOR

The government has rights in this invention pursuant to Contract No. DE-AC06-79ER10337 awarded by the U.S. Department of Energy.

BACKGROUND OF THE INVENTION

Oxygen and nitrogen are among the most widely used chemicals in the world, the annual consumption of each gas amounting to in excess of 20 million tons in the United States. Most of this oxygen is used in the steel industry and related metals manufacturing processes. Oxygen-enriched air has also found significant uses, including treatment of waste water, non-ferrous smelting, glass production, medical applications, and other chemical oxidation processes. In addition, there is a great potential market for oxygen-enriched air in the synthetic fuels industry. Nitrogen and nitrogen-enriched air are useful primarily for inert blanketing atmospheres and for refrigeration.

More than 99% of all oxygen and nitrogen is currently produced by cryogenic fractionation, or a process involving lowering the temperature of air sufficiently (to about $-215°$ C.) to liquefy it and then using a multistage distillation process to produce pure oxygen and pure nitrogen. A major drawback of such cryogenic processes is that they require a great deal of energy and consequently are very expensive.

An alternate method that has been used for producing oxygen-enriched air is a process called pressure-swing adsorption (PSA). In this process, so-called molecular-sieve zeolites preferentially adsorb nitrogen from air, leaving behind most of the oxygen and other components (chiefly argon). Numerous PSA processes and variations have been patented. See, for example, U.S. Pat. Nos. 2,944,627, 3,142,547, 3,237,377, 3,280,536, 3,430,418, 3,564,816 and 3,636,679. All of these processes make use of materials that selectively adsorb nitrogen, rather than oxygen, argon or other gases that may be present in a feed stream. By reducing the pressure, the adsorbed gas can be desorbed, which regenerates the adsorbent. PSA processes thus involve regular cycles of adsorption and desorption to effect gas separations.

In the case of nitrogen separation from air, nitrogen adsorption generally takes place at an elevated pressure (typically 2 to 5 atmospheres) and desorption occurs at or below about atmospheric pressure. Under optimum conditions, sufficient nitrogen can be removed from air to produce up to 96% oxygen in the nitrogen-depleted feed stream. Higher oxygen contents cannot be achieved because oxygen and argon (the primary "contaminant" gas present in air) have nearly identical adsorption properties and thus are not separated. Since air contains approximately 78.1% nitrogen, 20.9% oxygen, and 0.9% argon, removal of all of the nitrogen and equal percentages of the oxygen and argon results in production of a gas containing about 96% oxygen and 4% argon. Under typical operating conditions, the product gas contains about 90% oxygen, 6% nitrogen, and 4% argon. To avoid contamination of the zeolite, water and carbon dioxide must be removed from air prior to the PSA process. An additional result of removing nitrogen, rather than oxygen, from air is the presence in the product gas of other contaminant gases such as hydrocarbons, inert gases and oxides of sulfur and nitrogen that were present in the feed stream. PSA is economically competitive with cryogenic production of oxygen only in plant sizes up to perhaps 40 tons/day. Large-scale (100–3,000 tons/day) plants currently all use the cryogenic process.

It was observed by Tsumaki over 40 years ago in *Bull. Chem. Soc. Japan* 13 (1938) 252 that synthetic chelate-type compounds reversibly bind oxygen in the solid state. Subsequently, many researchers have investigated different chelate-type compounds in attempts to discover compounds that could be used to produce oxygen-enriched air. See, for example, the recent review by Jones, Summerville and Basolo in *Chem. Reviews* 79 (1979) 139. The most promising compound, commonly called fluomine,* has been studied for 35 years by the U.S. Air Force for potential use in providing breathing oxygen for crews of military aircraft. This compound is used to selectively bind oxygen at about 40° C. and 400 mmHg oxygen partial pressure, and releases oxygen at about 110° C. and 90 mmHg oxygen partial pressure. Fluomine is active in binding oxygen only in the solid state, and its activity is highly dependent on crystal structure. Furthermore, its useful operating lifetime is less than 10 days due to degradation of the fluomine at the elevated temperatures and pressures required for operation.

* N,N'-bis(3-fluorosalicylidene)ethylenediaminecobalt(II), described by Wilmarth, Aranoff and Calvin in *J. Amer. Chem. Soc.* 68 (1946) 2263, and by Adduci in *Chem. Tech.* 6 (1976) 575.

It is therefore a principal object of this invention to provide a commercially feasible non-PSA and non-cryogenic process for the separation of oxygen from atmospheric air or other oxygen-containing gaseous streams. It is another principal object of this invention to provide a commercially feasible non-PSA and non-cryogenic process for the separation of oxygen and nitrogen from atmospheric air.

These and other objects are accomplished by the method and apparatus of the present invention which is summarized and particularly described below.

SUMMARY OF THE INVENTION

Figure 1:
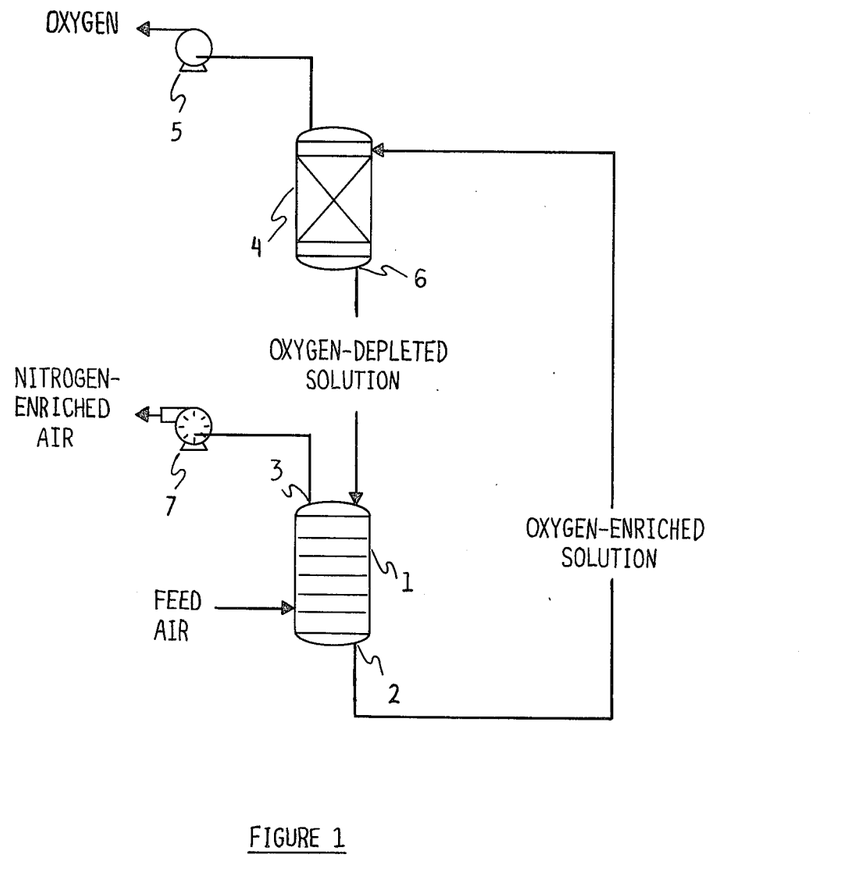
FIG. 1 is a schematic diagram showing the basic absorption and desorption modes and exemplary apparatus useful in the process of the present invention.

As schematically shown in FIG. 1, according to one embodiment of the present invention, oxygen is selectively separated from atmospheric air or other oxygen-containing gaseous stream (feed stream) by an absorption process comprising, alternately, (a) bringing the feed stream into contact with a solution containing a solvent or combination of solvents, an "axial base," and a metal-containing, oxygen-complexing agent (carrier) capable of reversibly binding oxygen (absorption mode); and (b) bringing said solution into contact with a product gaseous stream in which the oxygen partial pressure is maintained at least about 10 mmHg less than that of the feed stream (desorption mode).

In another embodiment of the present invention, also schematically shown in FIG. 1, oxygen is selectively separated from atmospheric air or other oxygen-containing gaseous stream (feed stream) by an absorption process comprising, alternately, (a) bringing the feed stream into contact with the same type of solution discussed above (absorption mode) and (b) heating said solution to a temperature at least about 5° C. higher than that of the absorption mode to cause the release of oxygen into a product gaseous stream (desorption mode).

In the process of the present invention, it has been discovered that certain combinations of solvents and nitrogen- and/or oxygen-containing Lewis bases defined as "axial bases" unexpectedly enhance the ability of certain metal-containing complexes (carriers) to selectively, rapidly and reversibly absorb and desorb oxygen in solution to produce oxygen-enriched air. Said combinations and carriers (carrier solutions) provide greater selectivity and more extended lifetime than anything encountered or predicted in the prior art. Oxygen concentrations as high as 98.8% have been demonstrated, which is much higher than that for any reported adsorption process. These carrier solutions have shown continuous operation for over 100 days, or a full order of magnitude better than any similar process previously reported.

A further advantage of the present invention over the prior art is that, since oxygen is selectively removed from the feed stream rather than nitrogen, the oxygen-enriched air produced does not contain the argon or other impurities that are present in oxygen-enriched air produced by PSA.

In the process of the present invention, the carrier binds and releases oxygen at the gas-liquid interface. It is advantageous, therefore, to maximize the gas-liquid interfacial area in order to increase the rate of absorption and desorption. This may be accomplished by a number of methods, including rapid stirring of the carrier solution; bubbling the feed stream through the carrier solution; forming a foam of the carrier solution; incorporating the carrier solution into microporous beads or other solid supports; spraying the carrier solution; or other methods or combinations of these methods apparent to those skilled in the art.

It may be advantageous in some cases to operate the invention using two stages of desorption in order to obtain essentially pure oxygen in the product stream. This can be accomplished by partially desorbing oxygen and nitrogen in the first stage, which removes from the solution a small percentage of the oxygen absorbed and a large percentage of the nitrogen absorbed, and then desorbing the remaining oxygen in the second stage.

Appropriate apparatus for utilizing the process and carrier solution of the present invention includes absorption and stripper means such as absorption and stripper columns, means for regulating pressure and circulating air and its components through the absorber section containing the carrier solution and for collecting the components, such as compressors, blowers, fans and vacuum pumps, means for regulating temperature, such as refrigeration and heating units, means for measuring and regulating the flow and partial pressure of air and its components, such as manometers, flow meters, valves and regulators, and means for storing the air components, such as storage and surge tanks. In addition, known stirring, bubbling and spraying apparatus may be used in maximizing the gas-liquid interface, such as magnetic stirrers, centrifugal stirrers, circulating pumps, spray towers, sievetray columns and other known aeration devices, as well as porous and microporous beads from about 0.1 to about 10 mm in diameter of any suitable inert material such as teflon, polysulfone or stainless steel or other solid supports for the carrier solution such as Berl saddles, Lessing rings and Pall rings contained in packed columns.

DETAILED DESCRIPTION OF THE INVENTION

The feed stream for the separation process of the present invention may be ordinary atmospheric air or other gaseous stream containing oxygen. Since, in the case of air, nitrogen is the only other primary component, the present invention is also useful for the recovery of nitrogen and nitrogen-enriched air. As schematically shown in FIG. 1, the feed stream is brought into contact with the carrier solution preferably in an absorber section 1 and preferably at substantially atmospheric pressure for economic reasons, but other pressures of the feed stream are also acceptable so long as the partial pressure of oxygen of the product stream in the stripper section 4 is at least approximately 10 mmHg lower than the oxygen partial pressure of the feed stream, or the temperature of the carrier solution in the desorption mode of the stripper section 4 is at least approximately 5° C. higher than the temperature of the carrier solution in the absorption mode. The feed stream input may be measured and controlled by a valve, flow meter or regulator (not shown) on the feed stream side of the absorber section 1. The lower partial pressure in the stripper section 4 may be maintained by any suitable means, for example a vacuum pump 5 equipped with a regulator (not shown) when the feed stream is of substantially atmospheric pressure. If a higher partial pressure on the feed stream side is desired this may be accomplished by compressor or fan means (not shown) on the feed stream side of the absorber section 1. The process of the present invention is preferably conducted at substantially room temperature and slightly cooler, but may be operated in the range of $-50°$ C. to $+100°$ C. Temperature may be controlled by any suitable refrigeration or heating means (not shown).

The carrier solution of the present invention comprises essentially three elements: (1) a solvent; (2) an "axial base"; and (3) an oxygen carrier.

Solvents found to be useful in the present invention are generally organic liquids or mixtures of organic liquids which are preferably polar, although non-polar liquids may be useful in some cases. In other cases, the solvent may comprise a mixture of organic liquids and water or water alone. The solvent, when combined with the axial base must dissolve the oxygen carrier at useful concentrations (preferably in excess of 0.05 M), and it should have a low nitrogen solubility, preferably less than 200 $cm^3$ (STP)/L at 760 mmHg. Classes of useful solvents include lactones, lactams, sulfoxides, nitriles, amides, amines, esters, ethers and other nitrogen-containing liquids. Preferred examples include gamma-butyrolactone, dimethylsulfoxide, N-methylpyrrolidone, propylene carbonate, dimethylacetamide, dimethylformamide, formamide, gamma-valerolactone, delta-valerolactone, epsilon-caprolactone, diethylsulfoxide, benzonitrile, and tributylphosphate. In addition, oligomers or polymers of these classes of solvents may be useful in some cases.

Generally speaking, "axial bases," or certain classes of Lewis bases usually containing a nitrogen atom or in some cases an oxygen, or sulfur, or phosphorus atom, or a combination of these must be present in the novel carrier solution of the present invention. Such an axial base provides an additional coordinating atom to those contained in the oxygen carrier, which assists in the reversible binding of oxygen. Classes of axial bases found useful are imidazoles, ketones, amides, amines, sulfoxides, pyridines, and other Lewis bases containing secondary or tertiary nitrogen. Preferred examples include 1-methylimidazole, 2-methylimidazole, 1,2-dimethylimidazole, dimethylsulfoxide, N,N'-diethylenediamine, 4-dimethylaminopyridine, 4-aminopyridine, pyridine, 4-methylpyridine, 4-methylaminopyridine, 3,4-lutidine, 3,5-lutidine, 4-cyanopyridine, 4-methoxypyridine, 4,4-bipyridine, pyrazine, and N-methylpyrazinium halides.

The oxygen carriers useful in the present invention may be described as metal-containing complexes containing the structure wherein M represents a metal such as cobalt, iron, nickel, copper, manganese, ruthenium, or rhodium; X is —O—, —S—,

R is hydrogen, alkyl, aryl, halogen, alkoxy or a nitrogen-containing moiety; and Y represents a halide, nitrate, thio-cyanate, or cyanide anion. Preferred metals are cobalt(II) and iron(II). Successful carriers must exhibit rapid oxygenation and deoxygenation, must be readily soluble in solutions of the solvents and axial bases noted above, and must be stable to irreversible oxidation or other degradation. The carriers generally bind oxygen at sufficiently high oxygen pressures and sufficiently low temperatures, and they generally release the oxygen at sufficiently low oxygen pressures and sufficiently high temperatures. Classes of such carriers found useful include metal-containing complexes generally of the following structures:

Bis(acetylaceton) ethylenediimine derivatives

N,N'—bis(salicylidene)ethylenediamine derivatives

-continued

Bis(2-amino-1-benzaldehyde)-ethylenediimine derivatives

Prophyrin derivatives

"Dry-cave" complex derivatives

-continued

N,N'—substituted ethylenediamine derivatives wherein M is the metal atom; the "R" groups represent hydrocarbon moieties with or without hetero-atoms, including alkyl groups, aryl groups, alkoxy groups, halides, or nitrogen-containing groups; and Y represents a halide, nitrate, thiocyanate or cyanide anion.

Specific examples include those shown in Tables I–IV, taken from a review by Jones, Summerville, and Basolo in *Chemical Reviews* 79 (1979) 139; those shown in Table V, described by Khare, Lee-Ruff and Lever in *Canad. J. Chem.* 54 (1976) 3424; those described by Stevens and Busch in *J. Amer. Chem. Soc.* 102 (1980) 3285; those described by Collman in *Accts. Chem. Res.* 10 (1977) 265; and those described by Almog, Baldwin, Dyer and Peters in *J. Amer. Chem. Soc.* 97 (1975) 226.

TABLE I

| Compound | V | A | B |
|---|---|---|---|
| Co(acacen) | —(CH$_2$)$_2$— | CH$_3$ | H |
| Co(Meacacen) | —(CH$_2$)$_2$— | CH$_3$ | CH$_3$ |
| Co(Phacacen) | —(CH$_2$)$_2$— | CH$_3$ | C$_6$H$_5$ |
| Co(benacen) | —(CH$_2$)$_2$— | C$_6$H$_5$ | H |
| Co(Clbenacen) | —(CH$_2$)$_2$— | p-ClC$_6$H$_4$ | H |
| Co(Brbenacen) | —(CH$_2$)$_2$— | p-BrC$_6$H$_4$ | H |
| Co(Mebenacen) | —(CH$_2$)$_2$— | p-CH$_3$C$_6$H$_4$ | H |
| Co(Meobenacen) | —(CH$_2$)$_2$— | p-CH$_3$OC$_6$H$_4$ | H |
| Co(bensacen)$^a$ | —(CH$_2$)$_2$— | C$_6$H$_5$ | H |
| Co(Clbensacen)$^a$ | —(CH$_2$)$_2$— | p-ClC$_6$H$_4$ | H |
| Co(Brbensacen)$^a$ | —(CH$_2$)$_2$— | p-BrC$_6$H$_4$ | H |
| Co(Mebensacen)$^a$ | —(CH$_2$)$_2$— | p-CH$_3$C$_6$H$_4$ | H |
| Co(Meobensacen)$^a$ | —(CH$_2$)$_2$— | p-CH$_3$OC$_6$H$_4$ | H |
| Co(sacacen)$^a$ | —(CH$_2$)$_2$— | CH$_3$ | H |
| Co(sacacen)$^a$ | —(CH$_2$)$_2$ | CH$_3$ | H |
| Co(sacsacpn)$^a$ | —CH$_2$—CH—<br>          CH$_3$ | CH$_3$ | H |
| Co(sacsactn) | —(CH$_2$)$_3$— | CH$_3$ | H |
| Co(sacsacchxn) | —CH$_2$—CH$_2$—<br>(CH$_2$)$_4$ | CH$_3$ | H |

$^a$oxygen atoms are replaced by sulfur

TABLE II

| Compound | W | D | E | F | G |
|---|---|---|---|---|---|
| Co(salen) | —(CH$_2$)$_2$— | H | H | H | H |
| Co(3-MeOsalen) | —(CH$_2$)$_2$— | CH$_3$O | H | H | H |
| Co(4,6-Me$_2$salen) | —(CH$_2$)$_2$— | H | CH$_3$ | H | CH$_3$ |
| Co(Fsalen) | —(CH$_3$)$_2$— | F | H | H | H |

TABLE II-continued

| Compound | W | D | E | F | G |
|---|---|---|---|---|---|
| Co(napsalen) | —(CH$_2$)$_2$— | H | b | H | H |
| Co(saloph) | —C$_6$H$_4$— | H | H | H | H |
| Co(sal(±)or(m)bn) | —CH—CH—<br>\|    \|<br>CH$_3$  CH$_3$ | H | H | H | H |
| Co(sal(±)or(m)dpen) | —CH—CH—<br>\|    \|<br>C$_6$H$_5$  C$_6$H$_5$ | H | H | H | H |
| Co(sal(±)or(m)chxn) | —CH—CH—<br>\\    /<br>(CH$_2$)$_4$ | H | H | H | H |
| Co(saldpt) | —(CH$_2$)$_3$—NH—(CH$_2$)$_3$— | H | H | H | H |
| Co(3-MeOsaldpt) | —(CH$_2$)$_3$—NH—(CH$_2$)$_3$— | CH$_3$O | H | H | H |
| Co(5-MeOsaldpt) | —(CH$_2$)$_3$—NH—(CH$_2$)$_3$— | H | H | CH$_3$O | H |
| Co(5-NO$_3$saldpt) | —(CH$_2$)$_3$—NH—(CH$_2$)$_3$— | H | H | NO$_2$ | H |
| Co(α-Mesaldpt) | —(CH$_2$)$_3$—NH—(CH$_2$)$_3$— | H | H | H | CH$_3$ |
| Co(salMedpt) | —(CH$_2$)$_3$—NCH$_3$—(CH$_2$)$_3$— | H | H | H | H |
| Co(3-MeOsalMedpt) | —(CH$_2$)$_3$—NCH$_3$—(CH$_2$)$_3$— | CH$_3$O | H | H | H |
| Co(5-MeOsalMedpt) | —(CH$_2$)$_3$—NCH$_3$—(CH$_2$)$_3$— | H | H | CH$_3$O | H |
| Co(α-MesalMedpt) | —(CH$_2$)$_3$—NCH$_3$—(CH$_2$)$_3$— | H | H | H | CH$_3$ |
| Co(sal-n-Prdpt) | —(CH$_2$)$_3$—N(n-C$_3$H$_2$)—(CH$_2$)$_3$— | H | H | H | H |
| Co(sal-i-Prdpt) | —(CH$_2$)$_3$—N(i-C$_4$H$_9$)—(CH$_2$)$_3$— | H | H | H | H |
| Co(salBydpt) | —(CH$_2$)$_3$—N(CH$_2$C$_6$H$_5$)—(CH$_2$)$_3$— | H | H | H | H |
| Co(salPhdpt) | —(CH$_2$)$_3$—N(C$_6$H$_5$)—(CH$_2$)$_3$— | H | H | H | H |
| Co(sal-p-MeOPhdpt) | —(CH$_2$)$_3$—N(p-CH$_3$OC$_6$H$_4$)—(CH$_2$)$_3$— | H | H | H | H |
| Co(5-BrsalMedapp) | —(CH$_2$)$_3$—PCH$_3$—(CH$_2$)$_3$— | H | H | Br | H |
| Co(3-MeosalMedapp) | —(CH$_2$)$_3$—PCH$_3$—(CH$_2$)$_3$— | CH$_3$O | H | H | H |
| Co(5-Brsaldape) | —(CH$_2$)$_3$—O—(CH$_2$)$_3$— | H | H | Br | H |
| Co(5-Clsaldape) | —(CH$_2$)$_3$—O—(CH$_2$)$_3$— | H | H | Cl | H |
| Co(saltmen) | —C——C—<br>\|    \|<br>(CH$_3$)$_2$  (CH$_3$)$_2$ | H | H | H | H |
| Co(salpy) | —CH$_2$—CH(CH$_2$CH$_2$C$_5$H$_4$N)— | H | H | H | H |

[b]Benzene rings are replaced by naphthalene rings.

TABLE III

| Compound | J | K |
|---|---|---|
| Co(amben) | H | H |
| Co(NO$_2$amben) | H | NO$_2$ |
| Co(MeOamben) | MeO | H |
| Co(cyen)[c] | H | H |

[c]ethylene bridge replaces the two protons on the nitrogen atoms.

TABLE IV

| Porphyrin | R$_1$ | R$_2$ | R$_3$ | R$_4$ |
|---|---|---|---|---|
| Protoporphyrin IX | Me | V | H | P |
| Mesoporphyrin IX | Me | Et | H | P |
| Deuteroporphyrin IX | Me | H | H | P |
| Pyrroporphyrin XV | Me | Et | H | P |
| meso-Tetraphenylporphin | H | H | Ph | H |
| Octaethylporphyrin | Et | Et | H | Et |

TABLE IV-continued

| Porphyrin | $R_1$ | $R_2$ | $R_3$ | $R_4$ |
|---|---|---|---|---|
| 2,4-Diacetyldeutero-porphyrin IX | Me | $COCH_3$ | H | P |

Abbreviations: Me, methyl; V, vinyl; P, propionic acid; Et, ethyl; Ph, phenyl.

TABLE V

| Compound | Y | $R_1$ | $R_2$ | $R_3$ |
|---|---|---|---|---|
| $Co(s-Me_2en)_2Y_2$ | Cl, Br, I, $NO_3$, SCN | H | $CH_3$ | H |
| $Co(s-Me_2en)_2Y_2$ | Cl, Br, I, $NO_3$, SCN | $CH_3$ | $CH_3$ | H |
| $Co(s-Et_2en)_2Y_2$ | Cl, Br, I, $NO_3$, SCN | H | $C_2H_5$ | H |

Four of the most preferred carriers are N,N'-bis(-salicylideneimino)di-n-propylaminecobalt(II) [Co(-salPr)], N,N'-bis(3-methoxysalicylidene)e-thylenediaminecobalt(II)[Co(3-MeOsalen)], N,N'-bis(3-methoxysalicylidene)tetramethyle-thylenediaminecobalt(II) [Co(3-MeOsaltmen)], and the Co(dry-caves), shown below:

Co(salPr)

Co(3-MeOsalen)

Co(dry-cave)*

Co(3-MeOsaltmen)

*Wherein $R_1$ is $(CH_2)_4$, $(CH_2)_5$, $(CH_2)_6$, $(CH_2)_7$, or $(CH_2)_8$ or branched-chain alkyl groups containing 4 to 8 carbon atoms; $R_2$ is $CH_3$ or H; $R_3$ is $CH_3$ or $C_6H_5$; $R_4$ is $(CH_2)_2$ or $(CH_2)_3$ When the configuration of the oxygen carrier is is the axial base may be dispensed with, for the reason that there are sufficient oxygen, nitrogen, or sulfur coordinating atoms present within the carrier itself.

In the case of Co(3-MeOsaltmen) and perhaps in other cases, small amounts of added water (on the order of less than 20% by volume) enhance carrier performance. This is unexpected in view of the fact that protic solvents such as water are generally known to irreversibly oxidize such metal complexes. A similar effect predictably occurs with some inorganic or organic acids, bases, or alcohols.

Referring again to FIG. 1, the absorber section 1 is preferably provided with one or more product-stream outlets 2 and 3 for the recovery of product. Outlet 2 is connected to a stripper section 4 which in turn is connected to a vacuum pump 5 for recovery of oxygen. Stripper section 4 may be provided with an outlet 6 for recycling oxygen-depleted solution to the absorber section 1. An oxygen analyzer (not shown) for determining the percentage of oxygen in the product stream, may be utilized either before or after the vacuum pump 5. The outlet of the vacuum pump 5 may be connected to a storage or surge tank (not shown) for storage of the recovered oxygen. Nitrogen-enriched air may be taken off through another outlet 3 of stripper section 1 by suitable means such as a fan 7. If desired, a flow meter or regulator (not shown) may also be used at either of the product-stream outlets.

$Et_2en)_2(SCN)_2$, $Co[16](NMe)C_5$-cave (a Co(dry cave) carrier) where $R_1$ is $(CH_2)_5$, $R_2$ and $R_3$ are $CH_3$, and $R_4$ is $(CH_2)_3$; $Co[16](NMe)C_6$-cave where $R_1$ is $(CH_2)_6$, $R_2$ is $CH_3$, $R_3$ is $CH_3$, and $R_4$ is $(CH_2)_3$; and Co(TpivPP) (a porphyrin) where $R_1$, $R_2$ and $R_4$ are hydrogen and $R_3$ is orthopivalamidophenyl.

TABLE VI

| Examples | Carrier Solution | Oxygen Absorption Pressure (mmHg) | Nitrogen Absorption Pressure (mmHg) | Oxygen Absorbed $\left(\frac{cm^3 (STP)}{liter}\right)$ | Nitrogen Absorbed $\left(\frac{cm^3 (STP)}{liter}\right)$ | Maximum Oxygen Content of Product Gas (%) |
|---|---|---|---|---|---|---|
| 1 | 0.05M Co(salPr) in DMSO | 160 | 500 | 390 | 22 | 95 |
| 2 | 0.2M Co(3-MeOsaltmen) + 0.6M DMAP + 0.55M $H_2O$ in NMP* | 140 | 540 | 1320 | 32 | 97 |
| 3 | 0.075M Co(s-$Et_2$en)($NO_3$)$_2$ + 2M s-$Et_2$-en** in formamide | 22 | 82 | 277 | 3.5 | 98.8 |
| 4 | 0.15M Co(s-$Et_2$en)$_2$(SCN)$_2$ + 0.7M s-$Et_2$en in formamide | 160 | 600 | >260 | 14 | >95 |
| 5 | 0.01M Co[16](NMe)$C_5$-cave + 0.5M 1-MeIm in BLO | 130 | 480 | 140 | 26 | 84 |
| 6 | 0.01M Co[16](NMe)$C_6$-cave + 1.5M 1-MeIm in DMSO | 30 | 110 | 200 | 4 | 98 |
| 7 | 0.01M Co[16](NMe)$C_6$-cave + 1.5M 1-MeIm in DMSO | 120 | 450 | 240 | 17 | 93 |
| 8 | 0.005M Co(TpivPP) + 0.01 1-MeIm in TBP | 110 | 410 | 90 | 47 | 66 |

*−5° C.
**s-$Et_2$en does not act as an axial base, but rather promotes the formation of a form of Co(s-$Et_2$en)$_2$($NO_3$)$_2$ that is active toward oxygen.

EXAMPLES

Absorption of oxygen and nitrogen by carrier solutions was demonstrated using a cablibrated vacuum apparatus to control the temperature, pressure and volume of the gases and solutions. To measure the oxygen or nitrogen sorption of a carrier solution, a known volume of the solution was placed in a small, stirred vial. The vial was then evacuated to degas the solution. A known volume of gas was then introduced into the vial from a gas burette, and the gas absorbed by the solution was calculated from measurement of the pressure and volume of the remaining gas. Different oxygen absorption pressures were tested in these examples; however, the nitrogen absorption pressure tested was always 3.7 times higher than the oxygen pressure, which is the ratio of partial pressures in air. The oxygen content of the product gas was calculated from the measured amounts of oxygen and nitrogen absorbed. In all cases except Example 2, the absorbed oxygen was desorbed from the carrier solution by decreasing the partial pressure of oxygen by completely evacuating the vial. In some cases, the absorption/desorption cycle was repeated to verify the stability of the process.

Representative results of oxygen and nitrogen absorption tests at 25° C. with carrier solutions are presented in Table VI. The oxygen carriers used in these examples were Co(salPr), Co(3-MeOsaltmen), Co(s-

Axial bases used were 4-dimethylaminopyridine (DMAP), N-N'-diethylethylenediamine (s-$Et_2$en), and 1-methylimidazole (1-MeIm), and solvents were dimethylsulfoxide (DMSO), N-methylpyrrolidone (NMP), formamide, and gamma-butyrolactone (BLO). In these tests, the oxygen and nitrogen absorption and desorption were measured and the maximum oxygen content of the product gas was calculated assuming complete removal of oxygen and nitrogen from the carrier solution in the desorption mode. The highest oxygen content of gas produced in these examples was 98.8%, which approaches that produced by cryogenic fractionation, and which is much higher than that produced by PSA processes. Several of these carrier solutions produced gas of greater than 95% oxygen content, and one (Example 4) was subjected to three absorption/desorption cycles with no loss in performance.

The carrier solution of Example 2 was subjected to four absorption/desorption cycles in which desorption was accomplished by raising the temperature from −5° C. to 25° C. rather than by decreasing the pressure as in the other examples. No loss in performance was observed. Considerable improvement in the performance shown in the examples is to be expected by using more concentrated carrier solutions in combination with solvents that have lower nitrogen solubilities. It should be noted that identical carrier solutions, when used in membrane configurations, maintain satisfactory oxygen-carrying performance for at least about 100 days, which in a diffusion-controlled process corresponds to at least about 400,000 absorption/desorption cycles. Excellent performance stability is therefore to be expected with the absorption process.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A process for the separation and purification of oxygen and nitrogen comprising:
   (a) bringing an atmospheric air feed stream into contact with a solution containing a solvent or solvent mixture, an axial base and an oxygen carrier, said solvent or solvent mixture being capable of dissolving the axial base and the oxygen carrier when they are present together, said axial base being capable of providing a coordinating atom to the oxygen carrier, and said oxygen carrier being a metal-containing complex having any of the structures

-continued wherein

M is a metal selected from cobalt, iron, copper, nickel, manganese, ruthenium or rhodium;

X is —O—, —S—,

R is hydrogen, alkyl, aryl, halogen, alkoxy or a nitrogen-containing moiety; and Y is halide, nitrate, thiocyanate or cyanide;

said solution absorbing oxygen from said atmospheric air feed stream;

(b) collecting nitrogen from the atmospheric air feed stream after the oxygen has been absorbed;

(c) desorbing oxygen from said solution to a gaseous product stream; and

(d) collecting oxygen from the product stream after the oxygen has been desorbed.

2. A process for the separation and purification of oxygen comprising:
   (a) bringing a gaseous, oxygen-containing feed stream into contact with a solution containing a solvent or solvent mixture, an axial base and an oxygen carrier, said solvent or solvent mixture being capable of dissolving the axial base and the oxygen carrier when they are present together, said axial base being capable of providing a coordinating atom to the oxygen carrier, and said oxygen carrier being a metal-containing complex having any of the structures -continued wherein
M is a metal selected from cobalt, iron, copper, nickel, manganese, ruthenium or rhodium;
X is —O—, —S—, $$-\underset{\underset{R}{|}}{P}- \text{ or } -\underset{\underset{R}{|}}{N}-;$$

R is hydrogen, alkyl, aryl, halogen, alkoxy or a nitrogen-containing moiety; and
Y is halide, nitrate, thiocyanate or cyanide;
said solution absorbing oxygen from said gaseous oxygen-containing feed stream;
(b) desorbing oxygen from said solution to a gaseous product stream; and
(c) collecting oxygen from the product stream after the oxygen has been desorbed.

3. The process of claims 1 or 2 wherein said desorption of oxygen is accomplished by bringing said solution into contact with a gaseous product stream with an oxygen partial pressure substantially less than that of said feed stream.

4. The process of claims 1 or 2 wherein said desorption of oxygen is accomplished by heating said solution and bringing it into contact with said gaseous product stream.

5. The process of claims 4 wherein the temperature of the feed stream is between about −50° C. and +95° C. and the temperature of the product stream is at least about 5° C. higher than the temperature of the feed stream.

6. The process of claim 1 or 2 wherein the metal is cobalt.

7. The process of claims 3 wherein the oxygen partial pressure of the product stream is at least about 10 mmHg less than the oxygen partial pressure of the feed stream.

8. The process of claim 7 wherein the oxygen partial pressure of the feed stream is substantially atmospheric or less than atmospheric.

9. The process of claim 7 wherein the oxygen partial pressure of the feed stream is at least about 10 mmHg higher than atmospheric and the oxygen partial pressure of the product stream is substantially atmospheric.

10. A process for the separation and purification of oxygen and nitrogen comprising:
(a) bringing an atmospheric air feed stream into contact with a solution containing a solvent or solvent mixture and a pentacoordinate oxygen carrier, said solvent or solvent mixture being capable of dissolving said pentacoordinate oxygen carrier, and said pentacoordinate oxygen carrier being a metal-containing complex having any of the structures wherein
M is a metal selected from cobalt, iron, copper, nickel, manganese, ruthenium or rhodium;
X is —O—, —S—, and
R is hydrogen, alkyl, aryl, halogen, alkoxy or a nitrogen-containing moiety;
said solution absorbing oxygen from said atmospheric air feed stream;
(b) collecting nitrogen from the atmospheric air feed stream after the oxygen has been absorbed;
(c) desorbing oxygen from said solution to a gaseous product stream; and
(d) collecting oxygen from the product stream after the oxygen has been desorbed.

11. The process of claims 1, 2, or 10 wherein the rates of absorption of oxygen into or desorption of oxygen from said solution are increased either by stirring or otherwise agitating said solution or by increasing the interfacial area between said feed stream and said solution, said interfacial area being increased by any of the following methods:

(a) bubbling said feed stream through said solution;

(b) spraying said solution through said feed stream;

(c) forming a foam of said solution with said feed stream;

(d) incorporating said solution into microporous beads; or (e) contacting said solution with said feed stream in a sieve-tray column or packed column.

12. The process of claims 1, 2 or 10 conducted at a temperature of between about $-50°$ C. and $+100°$ C.

13. The process of claims 1, 2 or 10 wherein the solvent is selected from lactones, lactams, sulfoxides, nitriles, amides, amines, esters, ethers, other nitrogen-containing liquids, water and mixtures thereof, the axial base is selected from secondary or tertiary nitrogen-atom-containing Lewis bases, imidazoles, ketones, amides, amines, sulfoxides and pyridines, and the oxygen carrier is selected from metal-containing bis(acetylacetone)ethylenediimines, N,N'-bis(-salicylidene)ethylenediamines, bis(2-amino-1-benzaldehyde)ethylenediimines, dry-cave compounds, and N,N'-substituted-ethylenediamines.

14. The process of claim 13 wherein the solvent is selected from at least one of gamma-butyrolactone, dimethylsulfoxide, propylene carbonate, diethylsulfoxide, N-methylpyrrolidone, dimethylacetamide, dimethylformamide, formamide, gamma-valerolactone, delta-valerolactone, epsilon-caprolactone, tributylphosphate, diglyme and benzonitrile, and the axial base is selected from at least one of 1-methylimidazole, 2-methylimidazole, 1,2,-dimethylimidazole, dimethylsulfoxide, N,N'-diethylethylenediamine, 4-dimethylaminopyridine, 4-aminopyridine, 4,4-bipyridine, 4-methoxypyridine, 4-methylaminopyridine, 3,4-lutidine, 3,5-lutidine, pyridine, 4-methylpyridine, 4-cyanopyridine, pyrazine, 4-pyrrolidinopyridine and piperidine.

15. The process of claim 14 wherein the oxygen carrier is N,N'-bis(3-methoxysalicylidene)ethylenediaminecobalt(II).

16. The process of claim 14 wherein the oxygen carrier is N,N'-bis(3-methoxysalicylidene)tetramethylethylenediaminecobalt(II).

17. The process of claim 14 wherein the oxygen carrier is wherein $R_1$ is a branched or straight-chain hydrocarbon or hetero-atom-containing bridge;

$R_2$ is hydrogen or methyl;

$R_3$ is methyl or benzyl; and $R_4$ is alkyl containing 2 to 3 carbon atoms.

18. The process of claims 1 or 10 wherein desorption is performed in two stages, the first of which results in desorption of a small percentage of the absorbed oxygen and a large percentage of the absorbed nitrogen, and the second stage of which results in desorption of a large percentage of the absorbed oxygen and a small percentage of the absorbed nitrogen.

19. A process for the separation and purification of oxygen comprising:

(a) bringing a gaseous, oxygen-containing feed stream into contact with a solution containing a solvent or solvent mixture and a pentacoordinate oxygen carrier, said solvent or solvent mixture being capable of dissolving said pentacoordinate oxygen carrier, and said pentacoordinate oxygen carrier being a metal-containing complex having any of the structures wherein M is a metal selected from cobalt, iron, copper, nickel, manganese, ruthenium or rhodium;

X is —O—, —S—, and

R is hydrogen, alkyl, aryl, halogen, alkoxy or a nitrogen-containing moiety;

said solution absorbing oxygen from said atmospheric air feed stream;

(b) desorbing oxygen from said solution to a gaseous product stream; and (c) collecting oxygen from the product stream after the oxygen has been desorbed.

20. The process of claims 10 or 19 wherein said desorption of oxygen is accomplished by bringing said solution into contact with a gaseous product stream with an oxygen partial pressure substantially less than that of said feed stream.

21. The process of claims 10 or 19 wherein said desorption of oxygen is accomplished by heating said solution and bringing it into contact with said gaseous product stream.

22. The process of claims 10 or 19 wherein the metal is cobalt and the solvent is selected from lactones, lactams, sulfoxides, nitriles, amides, amines, nitrogen-containing liquids, esters, ethers, water and mixtures thereof.

23. The process of claim 22 wherein the oxygen carrier is N,N'-bis(salicylideneimino)di-n-propylaminecobalt(II).

24. The process of claims 10 or 19 wherein the oxygen partial pressure of the product stream is at least about 10 mm Hg less than the oxygen partial pressure of the feed stream.

25. The process of claims 10 or 19 wherein the oxygen partial pressure of the feed stream is substantially atmospheric or less than atmospheric.

26. The process of claims 10 or 19 wherein the oxygen partial pressure of the feed stream is at least about 10 mm Hg higher than atmospheric and the oxygen partial pressure of the product stream is substantially atmospheric.

27. The process of claims 10 or 19 wherein the temperature of the feed stream is between about −50° C. and +95° C. and the temperature of the product stream is at least about 5° C. higher than the temperature of the feed stream.

28. A solution useful for the separation of oxygen and nitrogen from atmospheric air comprising a solvent or solvent mixture, an axial base and an oxygen carrier, said solvent or solvent mixture being capable of dissolving the axial base and the oxygen carrier when they are present together, said axial base being capable of providing a coordinating atom to the oxygen carrier, and said oxygen carrier being a mutual-containing complex having any of the structures -continued wherein M is a metal selected from cobalt, iron, copper, nickel, manganese, ruthenium or rhodium;

X is —O—, —S—,

R is hydrogen, alkyl, aryl, halogen, alkoxy or a nitrogen-containing moiety; and Y is halide, nitrate, thiocyanate or cyanide.

29. The solution of claim 28 wherein the solvent is selected from lactones, lactams, sulfoxides, nitriles, amides, amines, ester, ethers, other nitrogen-containing liquids, water and mixtures thereof, and the axial base is selected from Lewis bases containing secondary or tertiary nitrogen atoms, imidazoles, ketones, amides, amines, sulfoxides, pyrazines and pyridines.

30. The solution of claim 29 wherein the solvent is selected from lactones, lactams, sulfoxides, nitriles, amides, amines, esters, ethers, other nitrogen-containing liquids, water and mixtures thereof, the axial base is selected from at least one of 1-methylimidazole, 2-methylimidazole, 1,2,-dimethylimidazole, dimethylsulfoxide, N,N'-diethylethylenediamine, 4-dimethylaminopyridine, 4-aminopyridine, 4,4-bipyridine, 4-methoxypyridine, 4-methylaminopyridine, 3,4-lutidine, 3,5-lutidine, pyridine, 4-methylpyridine, 4-cyanopyridine, piperidine, 4-pyrrolidinopyridine and pyrazine, and the oxygen carrier is selected from N,N'-bis(3-methoxysalicylidene)ethylenediaminecobalt(II), N,N'-bis(3-methoxysalicylidene)tetramethylethylenediaminecobalt(II), and wherein
$R_1$ is a branched or straight-chain hydrocarbon or hetero-atom-containing bridge;
$R_2$ is hydrogen or methyl;
$R_3$ is methyl or benzyl; and
$R_4$ is alkyl containing 2 to 3 carbon atoms.

31. The solution of claim 29 wherein the solvent is selected from gamma-butyrolactone and N-methylpyrrolidone or mixtures thereof, the axial base is 4-dimethylaminopyridine and the oxygen carrier is N,N'-bis(3-methoxysalicylidene)tetramethylethylenediaminecobalt(II).

32. The solution of claim 29 wherein the solvent is selected from gamma-butyrolactone and N-methylpyrrolidone or mixtures thereof, the axial base is selected from 4-aminopyridine and 4-cyanopyridine and the oxygen carrier is N,N'-bis(3-methoxysalicylidene)tetramethylethylenediaminecobalt(II).

33. The solution of claims 30, 31 or 32 wherein the solvent contains an additive of less than 20 wt%, the additive being selected from the group consisting of water, organic or inorganic acids or bases.

34. A solution useful for the separation of oxygen and nitrogen from atmospheric air comprising a solvent or solvent mixture and a pentacoordinate oxygen carrier, said solvent or solvent mixture being capable of dissolving said pentacoordinate oxygen carrier, and said pentacoordinate oxygen carrier being a metal-containing complex having any of the structures wherein
M is a metal selected from cobalt, iron, copper, nickel, manganese, ruthenium or rhodium;
X is —O—, —S—, and
R is hydrogen, alkyl, aryl, halogen, alkoxy or a nitrogen-containing moiety.

35. The solution of claim 34 wherein the metal is cobalt and the solvent is selected from lactones, lactams, sulfoxides, nitriles, amides, amines, nitrogen-containing liquids, esters, ethers, water and mixtures thereof.

* * * * *

Notice of Adverse Decision in Interference

In Interference No. 101,471, involving Patent No. 4,451,270, I. C. Roman and R. W. Baker, ABSORPTION PROCESS FOR PRODUCING OXYGEN AND NITROGEN AND SOLUTION THEREFOR, final judgment adverse to the patentees was rendered Jan. 9, 1989, as to claims 1-9, 11-14, 17 and 18, 28-30 and 33.

*[Official Gazette May 30, 1989]*